(12) United States Patent
Novak et al.

(10) Patent No.: US 8,583,305 B2
(45) Date of Patent: Nov. 12, 2013

(54) SYSTEM AND METHOD FOR DETECTING VEHICLE WAKE-UP FAILURE

(75) Inventors: Voytek Novak, Sterling Heights, MI (US); Anthony E. Cubr, Fenton, MI (US); Vivekananda Shripathy, Farmington HIlls, MI (US)

(73) Assignee: GM Global Technology Operations LLC

( * ) Notice: Subject to any disclaimer, the term of this patent is extended or adjusted under 35 U.S.C. 154(b) by 379 days.

(21) Appl. No.: 13/076,922

(22) Filed: Mar. 31, 2011

(65) Prior Publication Data

US 2012/0253569 A1 Oct. 4, 2012

(51) Int. Cl.
*G06F 19/00* (2011.01)

(52) U.S. Cl.
USPC .......................................... 701/22; 180/65.21

(58) Field of Classification Search
USPC ........... 701/22, 36, 34.3, 53, 34.4, 31.9, 30.1, 701/29–1, 29.2, 29.9; 180/65.21; 713/323, 713/324, 330, 340, 320; 700/22, 12, 20, 3, 700/9
See application file for complete search history.

(56) References Cited

U.S. PATENT DOCUMENTS

| 6,381,110 | B1 * | 4/2002 | Nagashima et al. ............ 361/23 |
| 7,933,696 | B2 * | 4/2011 | Mayhew et al. ............. 701/34.3 |
| 2001/0016918 | A1 * | 8/2001 | Alexander et al. ............ 713/323 |
| 2009/0224869 | A1 * | 9/2009 | Baker et al. ..................... 340/5.1 |
| 2009/0234531 | A1 * | 9/2009 | Sayama et al. .................. 701/29 |

* cited by examiner

*Primary Examiner* — Marthe Marc-Coleman

(57) ABSTRACT

A control system for a vehicle includes a wake-up module and a failure detection module. The wake-up module selectively powers on a vehicle control module, wherein the vehicle control module controls sub-systems of the vehicle. The failure detection module detects a failure of the wake-up module during a period when the vehicle control module is powered off and an enable condition is met, wherein the failure is detected based on (i) whether an internal wake-up is requested or an external wake-up is requested during a first predetermined period and (ii) whether a run/crank (R/C) operation is requested.

20 Claims, 5 Drawing Sheets

SYSTEM AND METHOD FOR DETECTING VEHICLE WAKE-UP FAILURE

FIELD

The present disclosure relates to vehicle control systems and more particularly to a system and method for detecting a vehicle wake-up failure.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle control system may selectively transition between different operating modes. These operating modes may include an awake mode and a sleep mode. For example, the sleep mode may be when the vehicle control system is powered off. The vehicle control system may transition between the awake mode and the sleep mode (and vice-versa) based on a plurality of operating parameters. Additionally or alternatively, the vehicle control system may transition between the awake mode and the sleep mode (and vice-versa) according to predetermined scheduled transitions. For example, the vehicle control system may transition from the sleep mode to the awake mode ("wake-up") at a predetermined time.

SUMMARY

A control system for a vehicle includes a wake-up module and a failure detection module. The wake-up module selectively powers on a vehicle control module, wherein the vehicle control module controls sub-systems of the vehicle. The failure detection module detects a failure of the wake-up module during a period when the vehicle control module is powered off and an enable condition is met, wherein the failure is detected based on (i) whether an internal wake-up is requested or an external wake-up is requested during a first predetermined period and (ii) whether a run/crank (R/C) operation is requested.

A method for a vehicle includes selectively powering on a vehicle control module, wherein the vehicle control module controls sub-systems of the vehicle, and detecting a wake-up failure during a period when a vehicle control module is powered off and an enable condition is met, wherein the failure is detected based on (i) whether an internal wake-up is requested or an external wake-up is requested during a first predetermined period and (ii) whether a run/crank (R/C) operation is requested.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
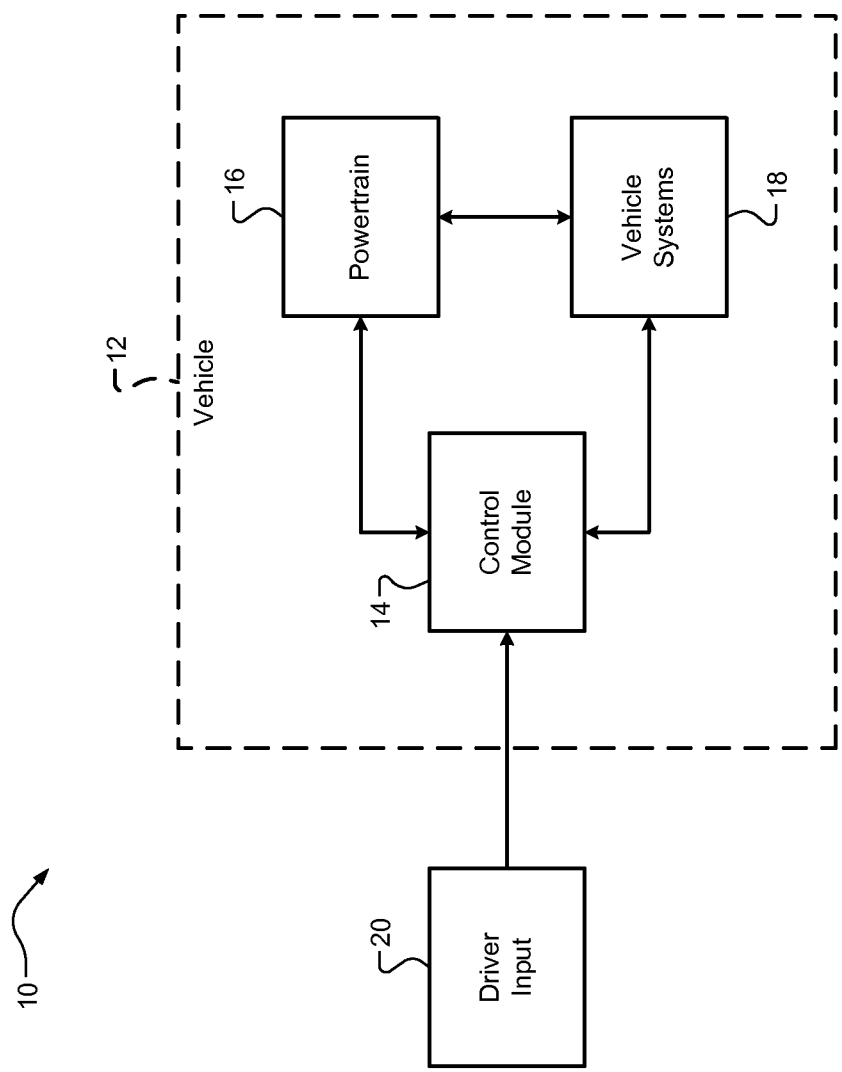
FIG. 1 is a functional block diagram of an example vehicle system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A vehicle control system may transition from a sleep mode to an awake mode (i.e., "wake-up") in a plurality of situations. The sleep mode may be when the vehicle control system is powered off. For example, all of the wakeups for the vehicle control system may be turned off during the sleep mode while the vehicle control system remains powered by a battery (e.g., 12V). The wake-up operation may be externally commanded or may be internal (also referred to as a "self wake-up"). For example, a self wake-up operation may be performed in order to execute scheduled diagnostic routines. Wake-up operations may be performed in response to a wake-up signal. A circuit generating the wake-up signal, however, may fail. For example, the circuit may fail due to a severed connection. Additional hardware may be implemented to detect wake-up failures. Implementing additional hardware, however, increases costs.

Accordingly, a system and method for detecting vehicle wake-up failure are presented. The system and method may decrease costs by using existing hardware to detect wake-up failures. The system and method may first determine whether a vehicle control module is asleep/deactivated (i.e., powered off) and an enable condition is met. The enable condition may include a presence of an alarm and/or expiration of a timer. For example, the timer may countdown and a start value of the timer may be predetermined. When the vehicle control module is asleep and the enable condition is met, the system and method may then detect a wake-up failure based on first, second, and third statuses.

The first status is based on whether a self wake-up of the control module is requested. The second status is based on whether another wake-up of the control module is requested during a predetermined period. The third status is based on whether a run/crank (R/C) operation is requested. For example, the system and method may detect a wake-up failure when (i) self wake-up is requested and/or another wake-up is requested during the predetermined period and (ii) an R/C operation is requested. The R/C operation may be requested by a driver of the vehicle via one of a push-button starter, a key cylinder starter, and a remote vehicle starter. When a wake-up failure is detected, the system and method may generate a warning signal.

Referring now to FIG. 1, an example vehicle system 10 includes a vehicle 12. The vehicle 12 includes a control module 14, a powertrain 16, and vehicle systems 18. The control module 14 controls operation of the vehicle 12. Specifically, the control module 14 communicates with and controls operation of both the powertrain 16 and the vehicle systems 18. For example, the control module 14 may control the powertrain 16 and/or the vehicle systems 18 based on driver input 20. The control module 14 may also implement the system or method of the present disclosure.

The powertrain 16 generates drive torque to propel the vehicle 12. The powertrain 16 may include an internal combustion engine such as a spark ignition (SI) engine, a diesel engine, or a homogeneous charge compression ignition (HCCI) engine. The powertrain 16 may also be part of a hybrid system and therefore may also include other components such as an electric motor and a battery system. The vehicle systems 18 include sub-systems of the vehicle 12. Specifically, the vehicle systems 18 may include sub-systems for hybrid vehicles, the sub-systems including but not limited to contactor control, rechargeable energy storage system (RESS) thermal control, on-board charger/plug-in control, refueling management, and an on-board diagnostic (OBD) timer.

Figure 2:
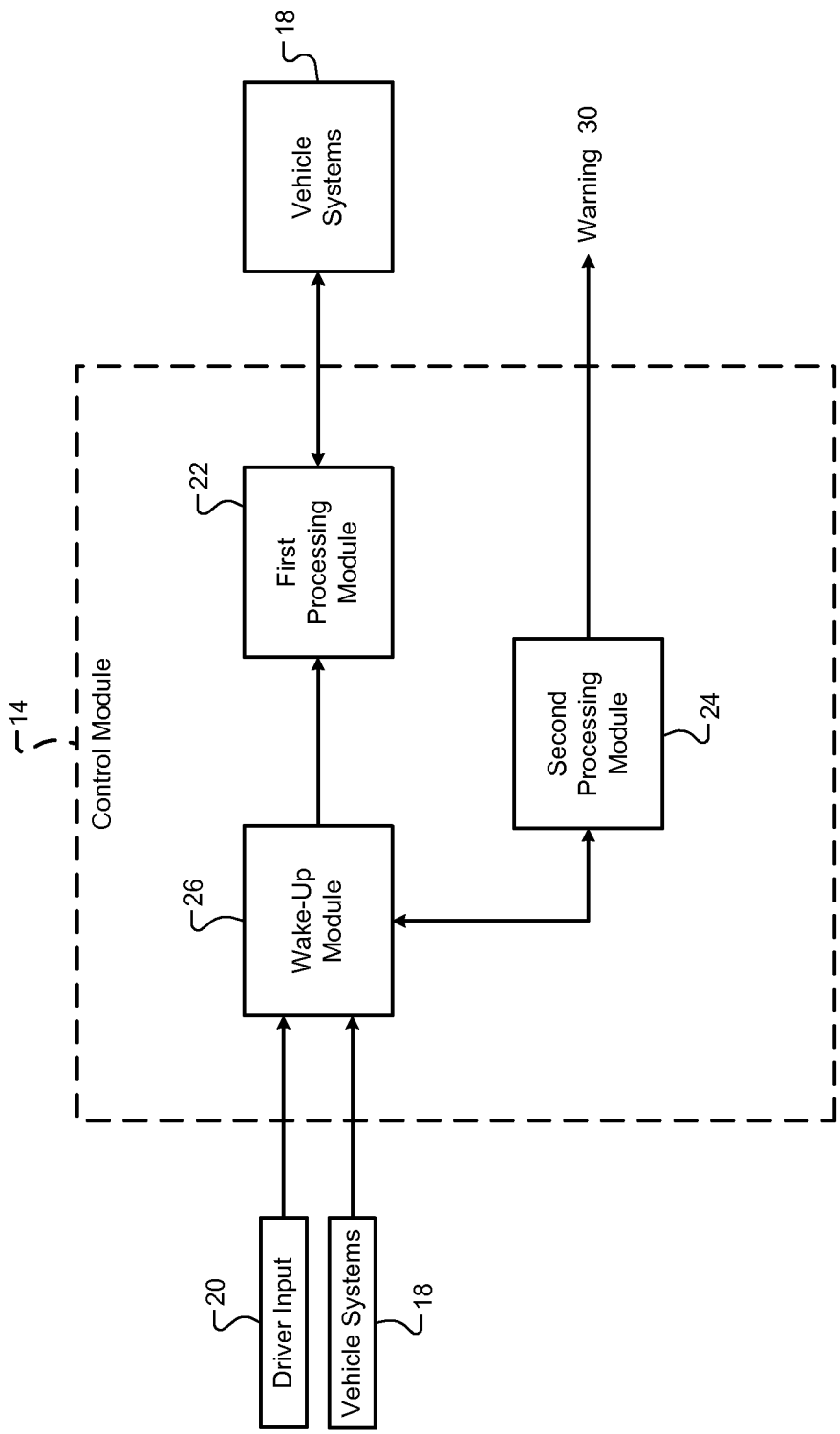
FIG. 2 is a functional block diagram of an example control module according to one implementation of the present disclosure.

Referring now to FIG. 2, an example of the control module 14 is shown. The control module 14 may include first and second processing modules 22 and 24, respectively, and a wake-up module 26.

The first processing module 22 controls execution of operations of the vehicle systems 18. The first processing module 22, therefore, may also be referred to as a main processing module. The first processing module 22 may include an OBD timer. For example, the OBD timer may be a real time clock or a diagnostic free-running counter. The first processing module 22 may be powered off to the sleep mode when no vehicle system operations are required.

The second processing module 24 controls execution of diagnostic operations of the first processing module 22 and the wake-up module 26. The second processing module 24 may always be on when power is supplied to the control module 14. The second processing module 24, therefore, may also be referred to as an auxiliary processing module. The second processing module 24 may include a key-off timer and an alarm clock. The key-off timer measures a key-off period. The alarm clock may expire after a predetermined alarm period (i.e., countdown to zero). The second processing module 24 may also generate an auxiliary wake-up signal for the wake-up module 26.

The wake-up module 26 selectively activates (i.e., powers on) the first processing module 22. The wake-up module 26 may receive one or more signals requesting wake-up via the driver input 20. Specifically, the wake-up module 26 may receive an R/C request, an accessory request, a refuel request, and/or another suitable wake-up request (e.g., from another module or one of the vehicle systems 18). For example only, the wakeup request for the refuel may be in response to the pressing of a refuel request switch for refueling purposes.

The wake-up module 26 may wake-up the first processing module 22 based on combinations of the received signals. Specifically, when the first processing module 22 is asleep and an enable condition is met, the wake-up module 26 may wake-up the first processing module 22 (i) an internal wake-up is requested or an external wake-up has been requested within a predetermined period and (ii) an R/C request has been received. If the first processing module 22 does not wake-up, the second processing module 24 (or a separate failure detection module) may generate a warning signal indicating a failure of the wake-up module 26.

Figure 3:
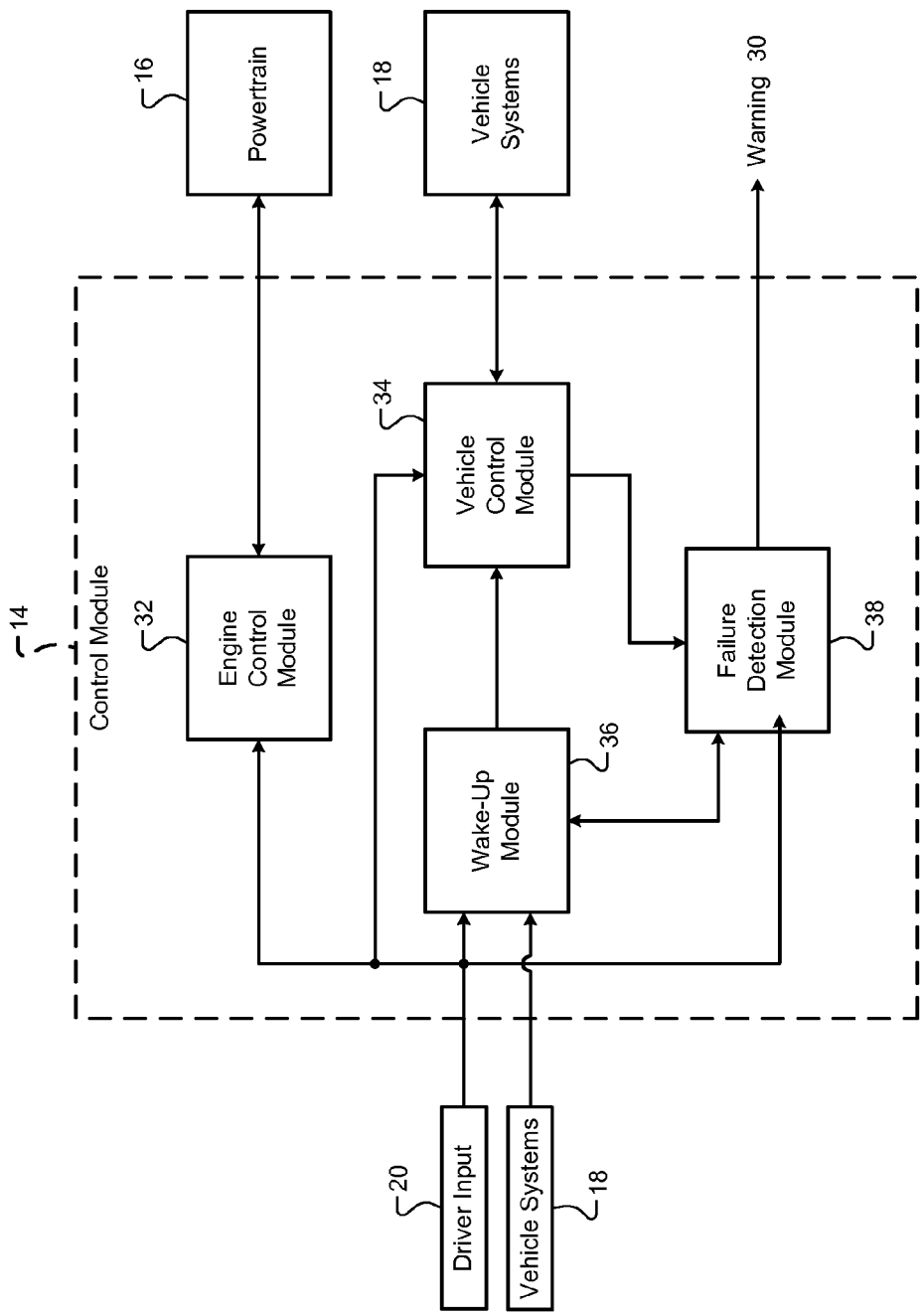
FIG. 3 is a functional block diagram of an example control module according to another implementation of the present disclosure.

Referring now to FIG. 3, another example of the control module 14 is shown. The control module 14 may include an engine control module (ECM) 32, a vehicle control module 34, a wake-up module 36, and a failure detection module 38. The ECM 32 communicates with and controls the powertrain 16. The vehicle control module 34 communicates with and controls the vehicle systems 18. For example, the vehicle control module 34 may be a vehicle integrated control module (VICM).

The wake-up module 36 controls wake-up operations of the vehicle control module 34. In other words, the wake-up module 36 selectively activates the vehicle control module 34. The wake-up operations may include both internal wake-up operations of the vehicle control module 34 and external wake-up operations of the vehicle control module 34. Internal wake-up operations may include scheduled periodic wake-up operations (e.g., predetermined time intervals) and wake-up operations in response to alarms. For example, the alarms may be based on at least one of distance driven, temperature, and/or battery system charge level. The battery thermal management may request wake-up for cooling/heating of a battery system and/or for time-of-day charging to start charging the battery system. For example only, a rate of charging the battery system may be based on the driver's desired departure time. In addition to the above, the wake-up operations through use of an alarm may also be requested by other modules. For example, wake-up operations may also include the ECM 32 requesting the vehicle control module 34 (VICM) wake-up for ECM 32 evaporative emissions diagnostics purposes.

External wake-up operations, on the other hand, may include wake-up operations requested by driver input. For example, the driver input may include an R/C request, an accessory request, a refuel request, and/or other suitable wakeup request by other modules (e.g., from one of the vehicle systems 18), but not through use of an alarm of the vehicle control module 34.

The failure detection module 38 detects failures of the wake-up module 36. In other words, the failure detection module 38 detects wake-up operation failures. The failure detection module 38 may generate a warning signal 30 when a wake-up failure is detected. For example, the warning signal 30 may notify a driver of the vehicle 12 that maintenance is required. The failure detection module 38 may first determine whether the vehicle control module 34 is asleep (i.e., deactivated) and whether an enable condition is met. For example, the enable condition may include a presence of an alarm and/or expiration of a timer. When the vehicle control module 34 is asleep and the enable condition is met, the failure detection module 38 may then monitor first, second, and third statuses.

The first status may be based on whether an internal/self wake-up is requested. The internal wake-up may be requested when an alarm has expired and/or a first predetermined period has elapsed. For example, the first predetermined period may correspond to a period for an OBD key-off timer to saturate. For example only, the first predetermined period may be approximately 67 hours. The second status may be based on whether an external wake-up has been requested within a second predetermined period. The third status may be based on whether an R/C operation has been requested. The failure detection module 38 may then detect a wake-up failure based on the first, second, and third statuses. Specifically, the failure detection module 38 may detect a failure when (i) an internal wake-up is requested or an external wake-up has been requested within the second predetermined period and (ii) an R/C operation has been requested.

Figure 4:
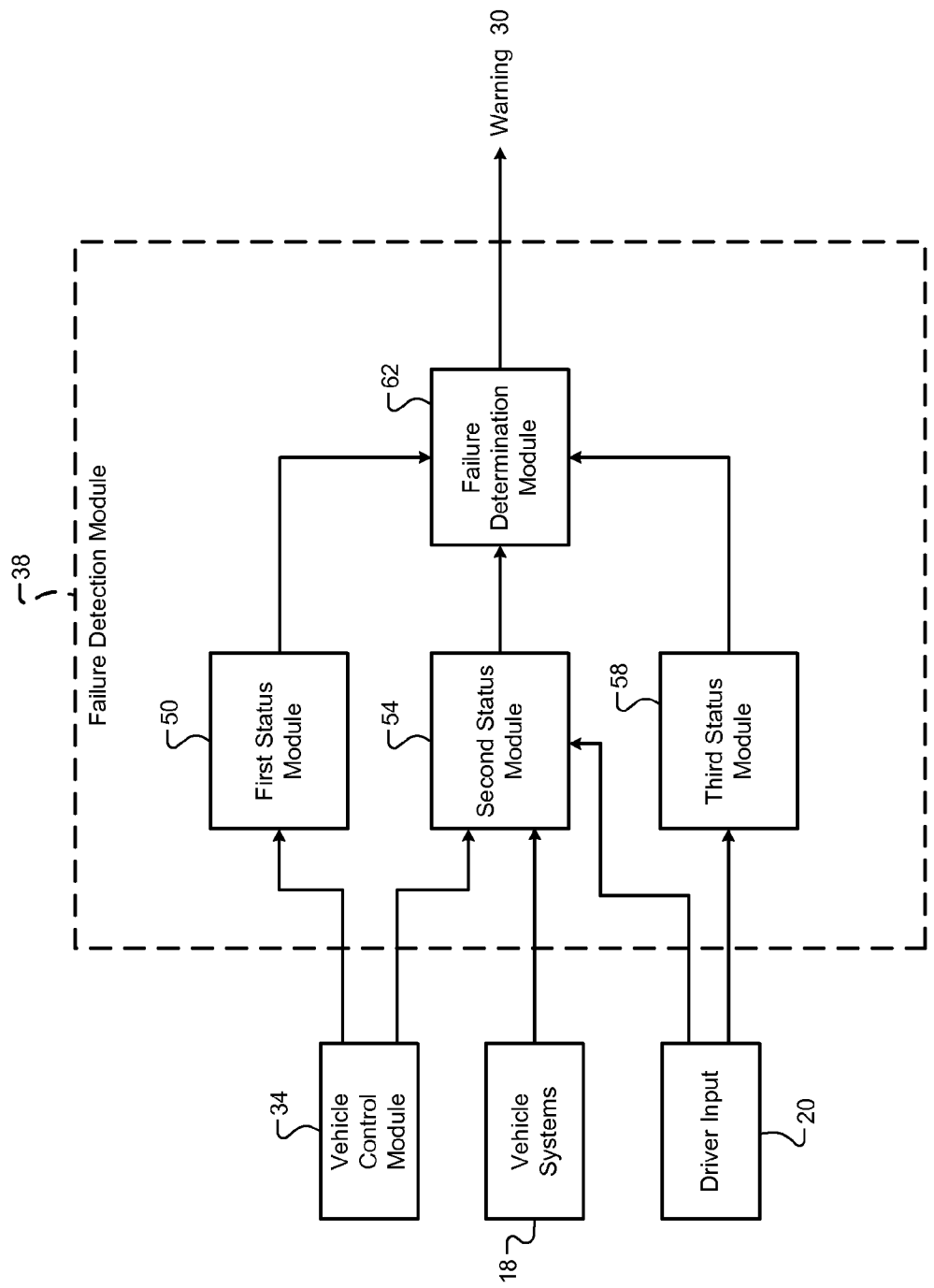
FIG. 4 is a functional block diagram of an example failure detection module according to one implementation of the present disclosure.

Referring now to FIG. 4, an example of the failure detection module 38 is shown. The failure detection module 38 may include a first status module 50, a second status module 54, a third status module 58, and a failure determination module 62. The failure detection module 38 may detect a failure of the wake-up module 36 based on driver input 20 and/or information from the vehicle control module 34. The failure detection module 38 may output the warning signal 30 when a failure is detected.

The first status module 50 may determine the first status. Specifically, the first status module 50 may determine whether an internal/self wake-up is requested. The internal wake-up may be requested when an alarm has expired or the first predetermined period has elapsed. The first status module 50 may receive notification from the vehicle control module 34 that an alarm has expired and/or the first predetermined period has lapsed.

The second status module 54 may determine the second status. Specifically, the second status module 54 may determine whether an external wake-up has been requested within the second predetermined period. The second status module 54 may receive the external wake-up from, for example, the vehicle systems 18 and/or driver input 20. The third status module 58 may determine the third status. Specifically, the third status module 58 may determine whether an R/C operation has been requested. The failure determination module 62 receives the first, second, and third statuses from the first, second, and third status modules 50, 54, and 58 respectively.

The failure determination module 62 may determine whether a failure of the wake-up module 36 has occurred based on the received statuses. For example, the failure determination module 62 may generate the warning signal 30 indicating a failure of the wake-up module 36 when the vehicle control module 34 is asleep (i.e., deactivated) and the enable condition is met, (i) at least one of an internal wake-up is requested and an external wake-up has been requested within the second predetermined period, and (ii) an R/C operation has been requested.

Figure 5:
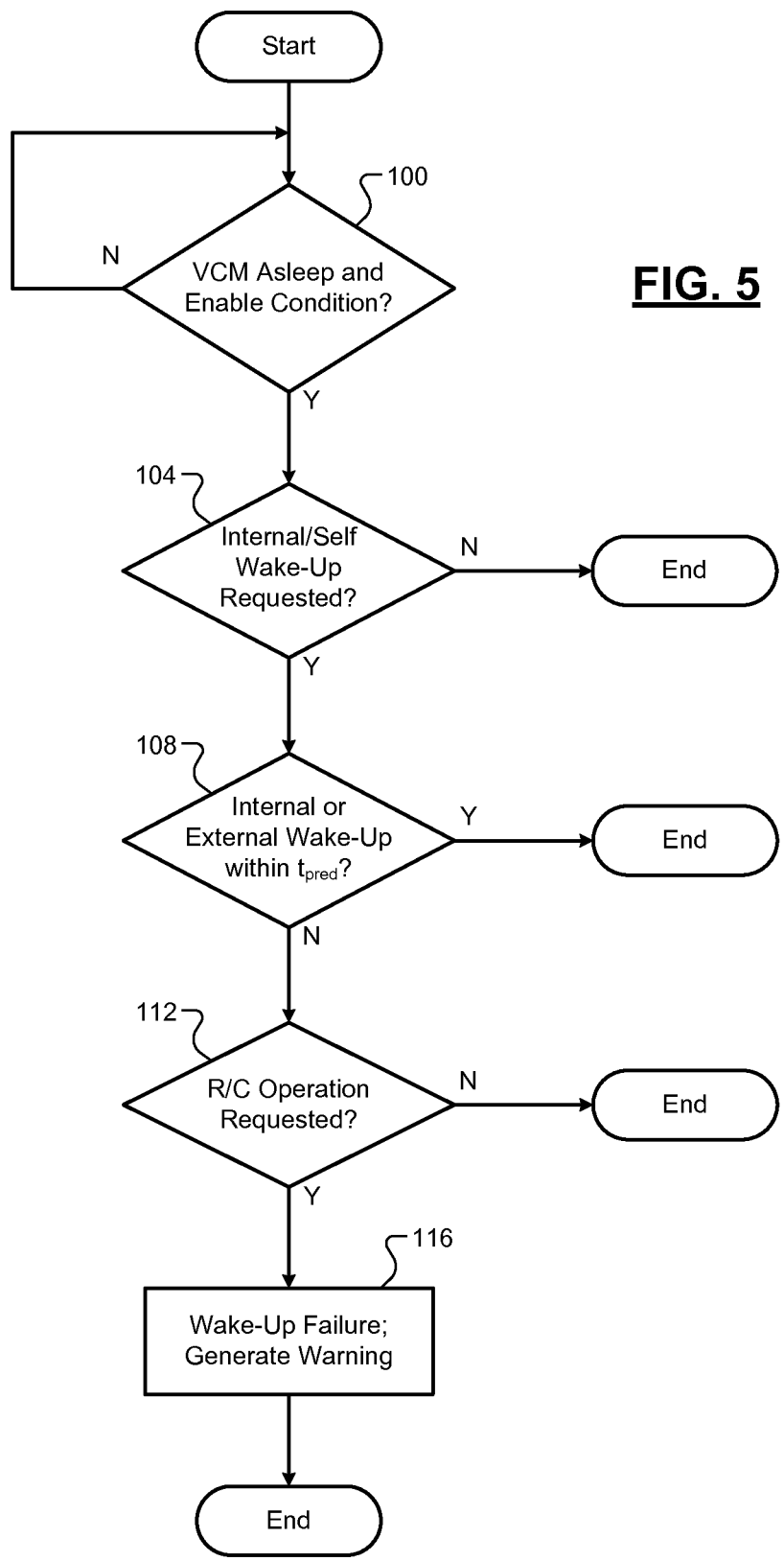
FIG. 5 is a flow diagram illustrating an example method for detecting a vehicle wake-up failure according to one implementation of the present disclosure.

Referring now to FIG. 5, an example method for detecting a vehicle wake-up failure begins at 100. At 100, the control module 14 may determine whether the vehicle control module (VCM) 34 is asleep and the enable condition is met. If true, control may proceed to 104. If false, control may return to 100. At 104, the control module 14 may determine whether an internal wake-up operation is requested. If true, control may proceed to 108. If false, control may end.

At 108, the control module 14 may monitor the first and second statuses. Specifically, the control module 14 may determine whether an internal wake-up operation is requested and/or an external wake-up operation has been requested within the second predetermined period (referred to here as $t_{pred}$). If false, control may proceed to 112. If true, control may end.

At 112, the control module 14 may monitor the third status. Specifically, the control module 14 may determine whether an R/C operation has been requested. If true, control may proceed to 116. If false, control may end. At 116, the control module 14 may generate the error signal indicating that a wake-up failure has been detected. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle, the control system comprising:
   a wake-up module that selectively powers on a vehicle control module, wherein the vehicle control module controls sub-systems of the vehicle; and
   a failure detection module that detects a failure of the wake-up module during a period when the vehicle control module is powered off and an enable condition is met, wherein the failure is detected based on (i) whether an internal wake-up is requested or an external wake-up is requested during a first predetermined period and (ii) whether a run/crank (R/C) operation is requested.

2. The control system of claim 1, wherein the failure detection module detects a failure of the wake-up module when (i) at least one of an internal wake-up is requested and an external wake-up is requested during the first predetermined period and (ii) an R/C operation is requested.

3. The control system of claim 1, wherein the enable condition includes at least one of a presence of an alarm and an expiration of a timer.

4. The control system of claim 1, wherein the internal wake-up is requested after a second predetermined period has lapsed, wherein the second predetermined period is based on a period for an on-board diagnostic (OBD) key-off timer to saturate.

5. The control system of claim 1, wherein the internal wake-up is requested when alarm expires.

6. The control system of claim 5, wherein the vehicle is a hybrid vehicle.

7. The control system of claim 6, wherein the alarm corresponds to at least one of energy storage thermal management, time of day charging, and evaporative emissions.

8. The control system of claim 1, wherein the external wake-up is requested based driver input including at least one of an R/C request, an accessory request, and a refuel request.

9. The control system of claim 1, wherein the R/C operation is requested by a driver of the vehicle via one of a push-button starter, a key cylinder starter, and a remote vehicle starter.

10. The control system of claim 1, wherein the failure detection module generates a warning signal when a wake-up failure is detected.

11. A method for a vehicle, the method comprising:
selectively powering on a vehicle control module, wherein the vehicle control module controls sub-systems of the vehicle; and
detecting a wake-up failure during a period when a vehicle control module is powered off and an enable condition is met, wherein the failure is detected based on (i) whether an internal wake-up is requested or an external wake-up is requested during a first predetermined period and (ii) whether a run/crank (R/C) operation is requested.

12. The method of claim 11, further comprising detecting a wake-up failure when (i) at least one of an internal wake-up is requested and an external wake-up is requested during the first predetermined period and (ii) an R/C operation is requested.

13. The method of claim 11, wherein the enable condition includes at least one of a presence of an alarm and an expiration of a timer.

14. The method of claim 11, wherein the internal wake-up is requested after a second predetermined period has lapsed, wherein the second predetermined period is based on a period for an on-board diagnostic (OBD) key-off timer to saturate.

15. The method of claim 11, wherein the internal wake-up is requested when alarm expires.

16. The method of claim 15, wherein the vehicle is a hybrid vehicle.

17. The method of claim 16, wherein the alarm corresponds to at least one of energy storage thermal management, time of day charging, and evaporative emissions.

18. The method of claim 11, wherein the external wake-up is requested based driver input including at least one of an R/C request, an accessory request, and a refuel request.

19. The method of claim 11, wherein the R/C operation is requested by a driver of the vehicle via one of a push-button starter, a key cylinder starter, and a remote vehicle starter.

20. The method of claim 11, further comprising generating a warning signal when a wake-up failure is detected.

* * * * *